United States Patent
Ahmed et al.

(10) Patent No.: US 12,379,513 B2
(45) Date of Patent: Aug. 5, 2025

(54) METHODS AND SYSTEMS FOR ANALYZING SEISMIC AMPLITUDE

(71) Applicant: SAUDI ARABIAN OIL COMPANY, Dhahran (SA)

(72) Inventors: Mukarram Ahmed, Dhahran (SA); Hassan Almomin, Saihat (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 360 days.

(21) Appl. No.: 18/067,591

(22) Filed: Dec. 16, 2022

(65) Prior Publication Data

US 2024/0201404 A1  Jun. 20, 2024

(51) Int. Cl.
*G01V 1/28* (2006.01)
*G01V 1/30* (2006.01)

(52) U.S. Cl.
CPC .............. *G01V 1/282* (2013.01); *G01V 1/301* (2013.01); *G01V 1/306* (2013.01); *G01V 2210/64* (2013.01)

(58) Field of Classification Search
CPC ........ G01V 1/282; G01V 1/306; G01V 1/301; G01V 2210/64
See application file for complete search history.

(56) References Cited

U.S. PATENT DOCUMENTS

| 8,213,261 B2 | 7/2012 | Imhof et al. |
| 9,696,442 B2 * | 7/2017 | Li ............................ G01V 3/38 |
| 9,817,142 B2 * | 11/2017 | Bornhurst .............. G01V 1/307 |
| 9,952,340 B2 * | 4/2018 | Bas .......................... G01V 1/30 |
| 2019/0383965 A1 | 12/2019 | Salman et al. |

FOREIGN PATENT DOCUMENTS

| CN | 111596978 A | 8/2020 |
| CN | 114428313 A | 5/2022 |
| NO | 2021077127 A1 | 4/2021 |

OTHER PUBLICATIONS

Duchesne et al., "Using poro-viscoelastic forward modeling to reduce exploration risks in frontier basins", 2012, DOI Publication, pp. 1-5 (Year: 2012).*

* cited by examiner

*Primary Examiner* — Elias Desta

(74) *Attorney, Agent, or Firm* — Vorys, Sater, Seymour and Pease LLP

(57) ABSTRACT

The identification of prospective hydrocarbon deposits within a subterranean formation suitable for exploration and production activities may be achieved with methods and systems that analyze seismic amplitude anomalies and identify prospective hydrocarbon deposits based on said analysis. For example, the methods and systems may generate and/or use a collection of seismic forward models that relate to the geological factors and seismic imaging artifacts that impact (or otherwise generate) seismic amplitude anomalies. The seismic forward models may be derived based on rock physics and petrophysics principles while also considering seismic imaging artifacts.

20 Claims, 6 Drawing Sheets

METHODS AND SYSTEMS FOR ANALYZING SEISMIC AMPLITUDE

FIELD OF THE DISCLOSURE

The present disclosure relates to oil and gas exploration, and more specifically, to the identification of prospective hydrocarbon deposits within a subterranean formation for exploration and production activities.

BACKGROUND OF THE DISCLOSURE

Seismic data is often collected for hydrocarbon-bearing formations as a tool for identifying prospective hydrocarbon deposits in a subterranean formation. Seismic amplitude anomalies, or abrupt changes in seismic amplitude, are often an indicator of a hydrocarbon deposit. However, a seismic amplitude anomaly may manifest in seismic data because of the geology factors (e.g., rock porosity, lithology, fluid type, and the like) or for seismic imaging artifacts. The seismic signal characteristics of an individual seismic amplitude anomaly may be contributed to by several geological and seismic imaging artifacts. Improving the accuracy of identifying the cause of seismic amplitude anomalies may improve the identification of prospective hydrocarbon deposits.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method can comprise: identifying a seismic amplitude anomaly in seismic data of a portion of a subterranean formation; associating geological-property data, geophysical-parameter data, or both corresponding to the seismic amplitude anomaly with the identified seismic amplitude anomaly; producing one or more seismic forward models each based on a scenario that accounts for an actual seismic amplitude response for the seismic amplitude anomaly and the geological-property data and/or geophysical-parameter data, wherein at least one of the one or more seismic forward models includes at least one seismic imaging artifact; adjusting input parameters for each of the one or more seismic forward models so that a seismic amplitude response produced by the seismic forward model at least substantially matches the actual seismic amplitude response for the seismic amplitude anomaly; training a supervised neural network using the one or more seismic forward models and corresponding adjusted input parameters; and generating a synthetic seismic forward model with the trained neural network.

In another embodiment, a machine-readable storage medium having stored thereon a computer program comprising a routine of set instructions for causing the machine to perform the steps of: identifying a seismic amplitude anomaly in seismic data of a portion of a subterranean formation; associating geological-property data and/or geophysical-parameter data corresponding to the seismic amplitude anomaly therewith; producing one or more seismic forward models each based on a scenario that accounts for an actual seismic amplitude response for the seismic amplitude anomaly and the geological-property data and/or geophysical-parameter data, wherein at least one of the one or more seismic forward models includes at least one seismic imaging artifact; adjusting input parameters for each of the one or more seismic forward models so that a seismic amplitude response produced by the seismic forward model at least substantially matches the actual seismic amplitude response for the seismic amplitude anomaly; training a supervised neural network using the one or more seismic forward models and corresponding adjusted input parameters; and generating a synthetic seismic forward model with the trained neural network.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
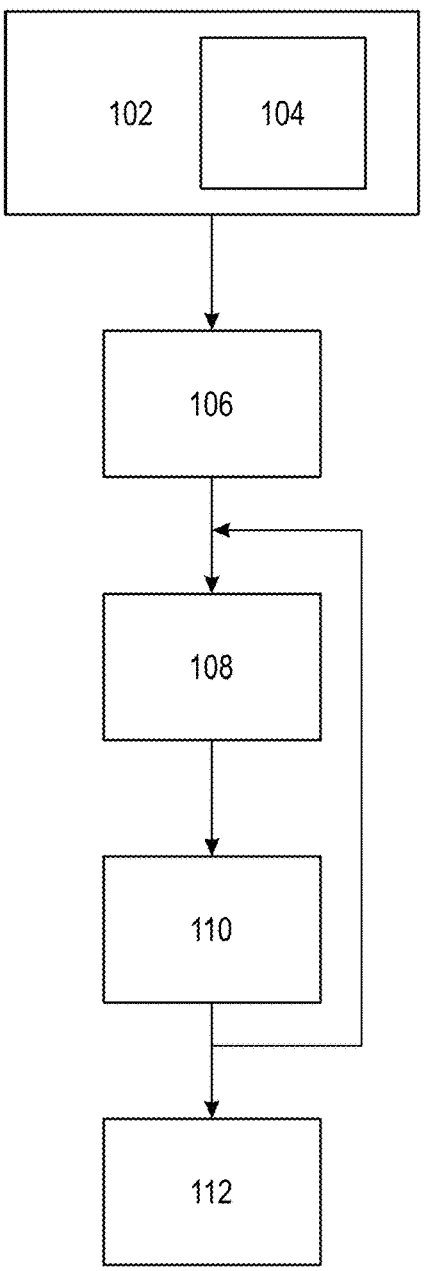
FIG. 1 is an example method according to an embodiment of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to methods and systems, including computer-implemented methods, computer-program products, and computer systems, to analyze seismic amplitude anomalies and identify prospective hydrocarbon deposits based on said analysis. More specifically, the methods and systems described herein may generate and/or use a collection of seismic forward models that relate to the geological factors and seismic imaging artifacts that impact (or otherwise generate) seismic amplitude anomalies. The seismic forward models are derived based on rock physics and petrophysics principles while also considering seismic imaging artifacts. The analyses described herein are rooted in physics but considering artifacts of the measurement technique may increase the accuracy of the analyses and, consequently, increase the confidence in identified prospective hydrocarbon deposits and their production potential.

In the methods and systems described herein, the quality of the data used can affect the accuracy of and confidence in prospective hydrocarbon deposits. For example, low-quality data, missing data, and/or spatially-uncorrected data may cause the analyses described herein to be less accurate.

Data used in the analyses described herein can be 1-dimensional data, 2-dimensional data, 3-dimensional data, or any combination thereof. Further, the data includes seismic data that may be collected by any suitable method where higher resolution data is preferred. Data may also come from sources that include, but are not limited to, resistivity logs, gamma-ray logs, density logs, neutron logs, nuclear magnetic resonance logs, core sample descriptions, core sample measurements, the like, and any combination thereof.

In practice, data relating to a formation is taken over time and at different conditions, which may necessitate correction (or compensation) in the data. For example, borehole conditions like temperature can affect wireline data. Corrections to geophysical logs and other data may be made for poor borehole conditions (e.g., density, compressional sonic, and shear sonic). Further, despiking and synthesizing missing sections may be performed using either known empirical methods or machine learning methods.

Performing such corrections, time-correlations, and depth-correlations produces conditioned data that is more accurate as to values of the data and the location of the data within the formation. This allows for more accurate spatial-correlation between vertical seismic profiles and other conditioned data.

The conditioned data may be first analyzed using rock physics techniques that correlate properties like porosity, saturation, and mineral constituents to elastic properties like acoustic impedance, velocity ratio, Poisson ratio, and the like, which can be derived from seismic amplitude data as well as other data (e.g., various log data and various core sample data).

Figure 2:
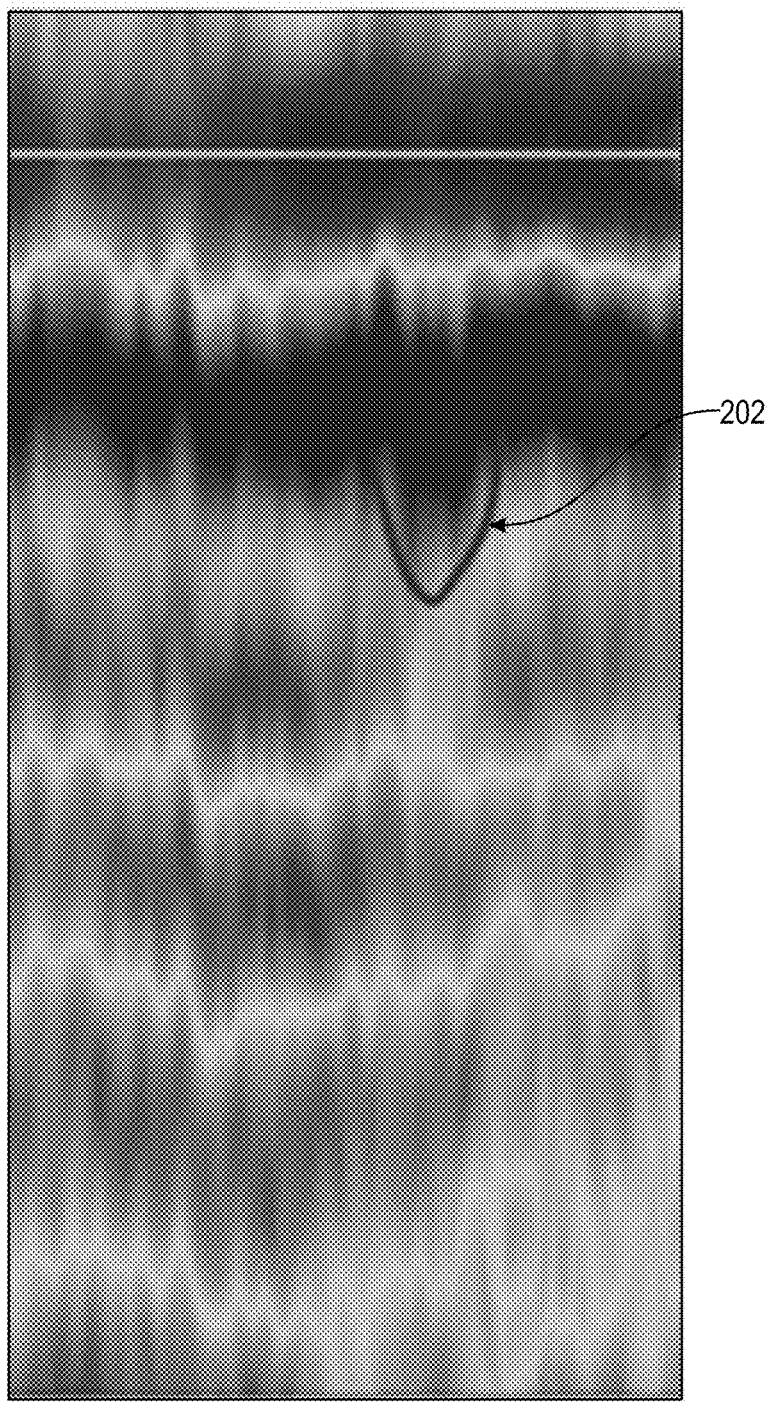
FIG. 2 illustrates seismic data for a portion of a subterranean formation that has a seismic amplitude anomaly.

FIG. 1 is an example method 100 of the present disclosure. Preferably using conditioned data, seismic amplitude anomalies 102 (abrupt changes in seismic amplitude) are first identified. FIG. 2 illustrate seismic data for a portion of a subterranean formation that has a seismic amplitude anomaly 202.

Referring again to FIG. 1, once identified, the seismic amplitude anomalies 102 are associated with any data 104 at or around (e.g., within 10 meters) the seismic amplitude anomaly. The data 104 may include geological-property data and/or geophysical-parameter data.

Examples of the geological properties may include, but are not limited to, rock matrix, porosity, lithology, pore fluids, the like, and any combination thereof.

Examples of the geophysical parameters may include, but are not limited to, signal-to-noise ratio, seismic frequency, wavelets, the like, and any combination thereof.

The seismic amplitude anomalies 102 with corresponding data 104 are then used to produce one or more seismic forward models 106. Here, factors that could contribute to the actual seismic amplitude response including geological factors (e.g., rock matrix, porosity, lithology, pore fluids, and the like) or seismic imaging artifacts (e.g., acquisition footprints, velocity discrepancies, and the like) are considered. With the known corresponding data 104 and the actual seismic amplitude response for the seismic amplitude anomaly 102, different possible scenarios are compiled that include geological factors and/or seismic imaging artifacts that could result in a seismic response similar to the actual seismic amplitude response for the seismic amplitude anomaly 102. For example, a first scenario may consider an acquisition footprint being present and the data 104, and a second scenario may consider the data 104 alone with no acquisition footprint being present. With these inputs, a seismic forward model 106 for each of the different scenarios is derived using known rock physics and petrophysics principles as well as known imaging or artifact generation principles. Then, input parameters (e.g., seismic velocity Vs, seismic velocity Vp, density, seismic frequency, tuning thickness, and the like) in the seismic forward models 106 may be adjusted so that the seismic response of the seismic forward model 106 is at least substantially the same (e.g., an $R^2$ within about 0.95 (95%) (preferably about 0.98 (98%)) as the actual seismic amplitude response for the seismic amplitude anomaly 102.

Figure 3A:
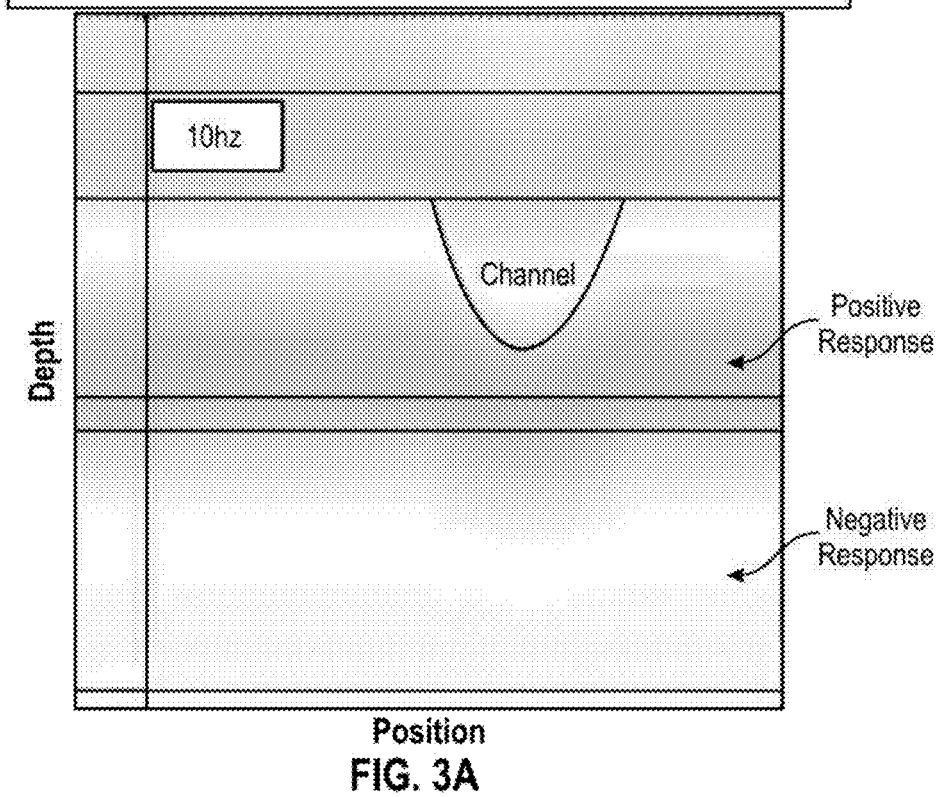
FIGS. 3A-3C illustrates a series of synthetic seismic responses by varying three geological properties and geophysical parameters, specifically, seismic frequency, reservoir porosity, and reservoir lithology, respectively.
Figure 3B:
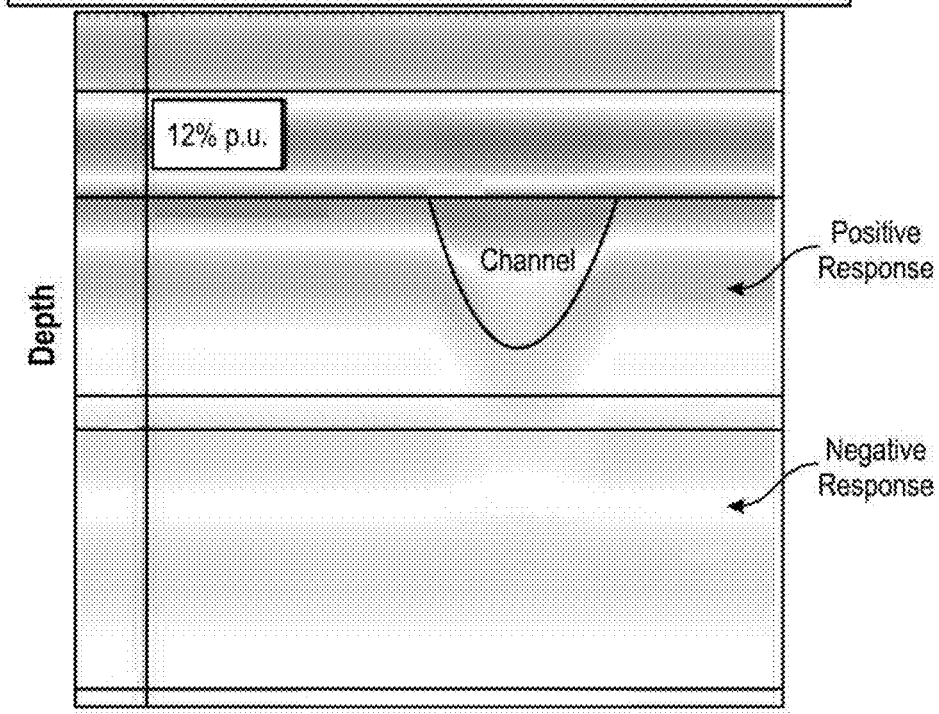
Figure 3C:
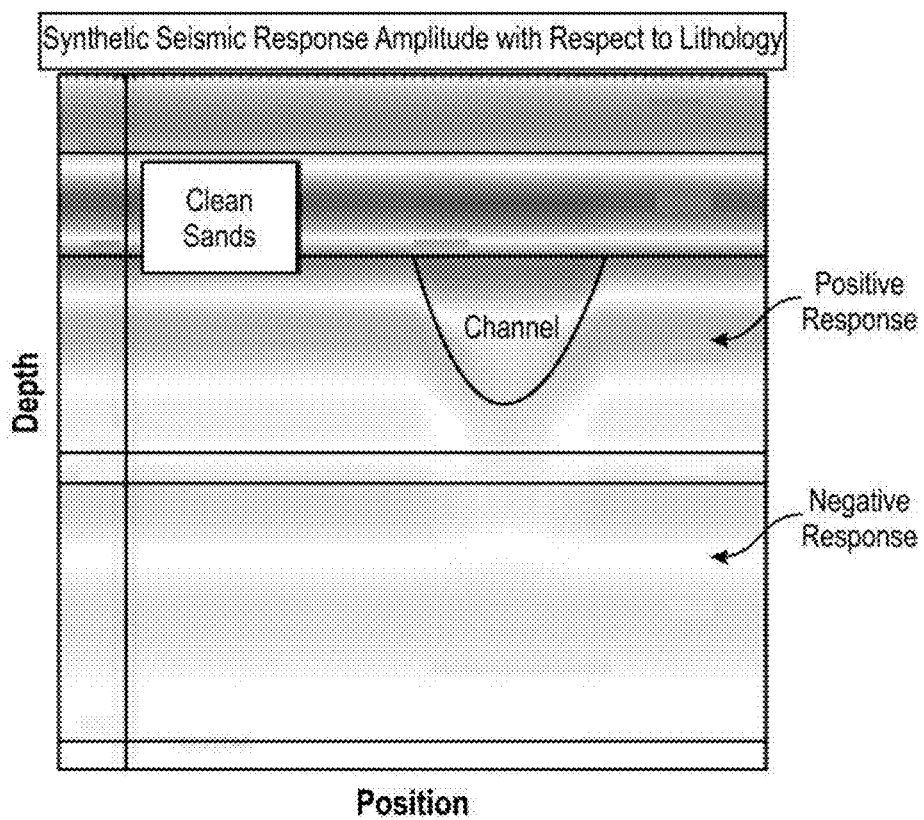

FIGS. 3A-3C illustrates a series of synthetic seismic responses by varying three geological properties and geophysical parameters, specifically, seismic frequency, reservoir porosity, and reservoir lithology, respectively. With only three selected attributes (geological properties and geophysical parameters), one can have hundreds of scenarios to model but said scenarios are limited by the prior knowledge of local geology and seismic data quality. Each of these attributes (each geological property and each geophysical parameter), or combination of these, can have an effect on the seismic amplitude behavior, making the amplitude behavior bright, sharp, or even dimming in character.

More specifically, FIG. 3A illustrates the synthetic seismic response of sand mixed filled (mixed filled means not clean sand—but sand mixed with silts) channel at 10 Hz frequency with low porosity in the channel of 3% porosity units (p.u.). FIG. 3B illustrates the sand-mixed filled channel response with higher frequency of 25 Hz but increased channel porosity of 12% p.u. FIG. 3C illustrates the clean-sand-filled channel response at 25 Hz frequency with 12% p.u. It is noted that as the seismic frequency is increased with increased porosity and cleaner lithologies, the channel amplitude response becomes clearer for the interpreter.

Referring again to FIG. 1, the one or more seismic forward models 106 with corresponding input parameters and corresponding data 104 can then be used to train (e.g., using a gradient-based method and back-propagation method) a supervised neural network (e.g., a convolutional neural network) to yield a trained neural network 108.

Figure 4:
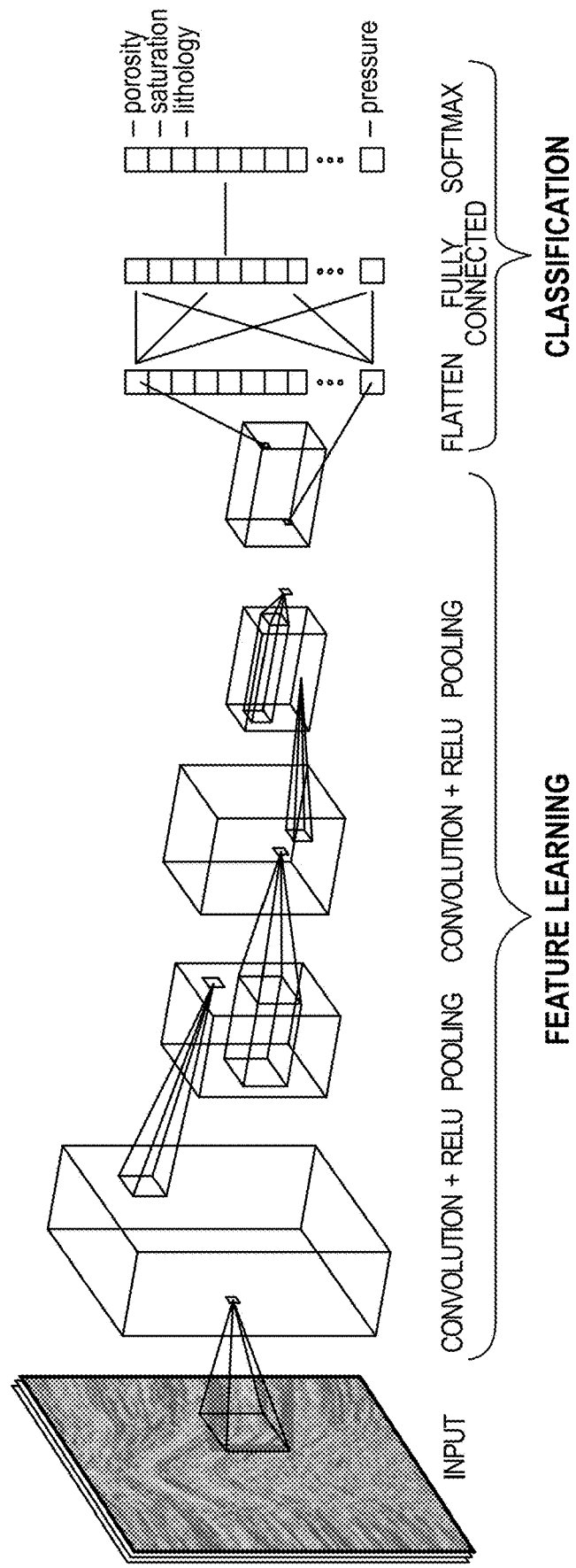
FIG. 4 illustrates a neural network with many convolution layers, which may be suitable for use in the methods and systems described herein.

FIG. 4 illustrates a neural network with many convolution layers, which may be suitable for use in the methods and systems described herein.

Referring again to FIG. 1, the trained neural network 108 can then generate new seismic forward models 110 (also referred to as synthetic seismic forward models) with constraints (e.g., the local geological features and the known seismic imaging artifacts) on the possible scenarios. The resulting synthetic seismic forward models 110 are then validated. Validation can be a blind validation using a seismic amplitude anomaly already characterized but not included in the data used to produce the one or more seismic forward models 106. Validated synthetic seismic forward models are added to a database 112 associated with the trained neural network 108. When a synthetic seismic forward model 110 does not pass validation, the neural network 108 is returned for additional training.

The validated, synthetic seismic forward models in the database 112 may be used within their constraints to analyze seismic amplitude anomalies in other portions for the subterranean formation and/or be incorporated into reservoir-scale models. Advantageously, once prepared, the validated, synthetic seismic forward models may be applicable regionally in similar types of subterranean formation, which may increase the accuracy and speed when identifying prospective hydrocarbon deposits.

The analysis of seismic amplitude anomalies with validated, synthetic seismic forward models described herein provide an indication of the cause of the individual seismic amplitude anomalies. For example, the validated, synthetic seismic forward models may indicate that an anomaly is likely due to an imaging artifact. Accordingly, that portion of the subterranean formation may have a low prospect for hydrocarbon deposits. Alternatively, the synthetic seismic forward models may indicate that an anomaly is likely due to hydrocarbons. Accordingly, that portion of the subterranean formation may be a high prospect for hydrocarbon deposits and be explored and produced more quickly than the previous area of the formation.

After one or more prospective hydrocarbon deposits are identified using the validated, synthetic seismic forward models described herein, the prospective hydrocarbon deposits may be displayed in a 3-dimensional model of the formation or any other suitable display. Information relating to the prospective hydrocarbon deposit (e.g., geological-property data, geophysical-parameter data, likelihood or certainty or probability of hydrocarbon deposit, and the like) may also be available and/or displayed.

Further, after one or more prospective hydrocarbon deposits are identified using the validated, synthetic seismic forward models described herein, a hydrocarbon exploration and/or production operation may be performed into at least one of the one or more prospective hydrocarbon deposits. Examples of exploration operations may include, but are not limited to, drilling, coring, logging, or any combination thereof. Examples of production operations may include, but are not limited to, producing hydrocarbons, fracturing and propping the formation, acidizing the formation, or any combination thereof.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 5. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such as, for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 5:
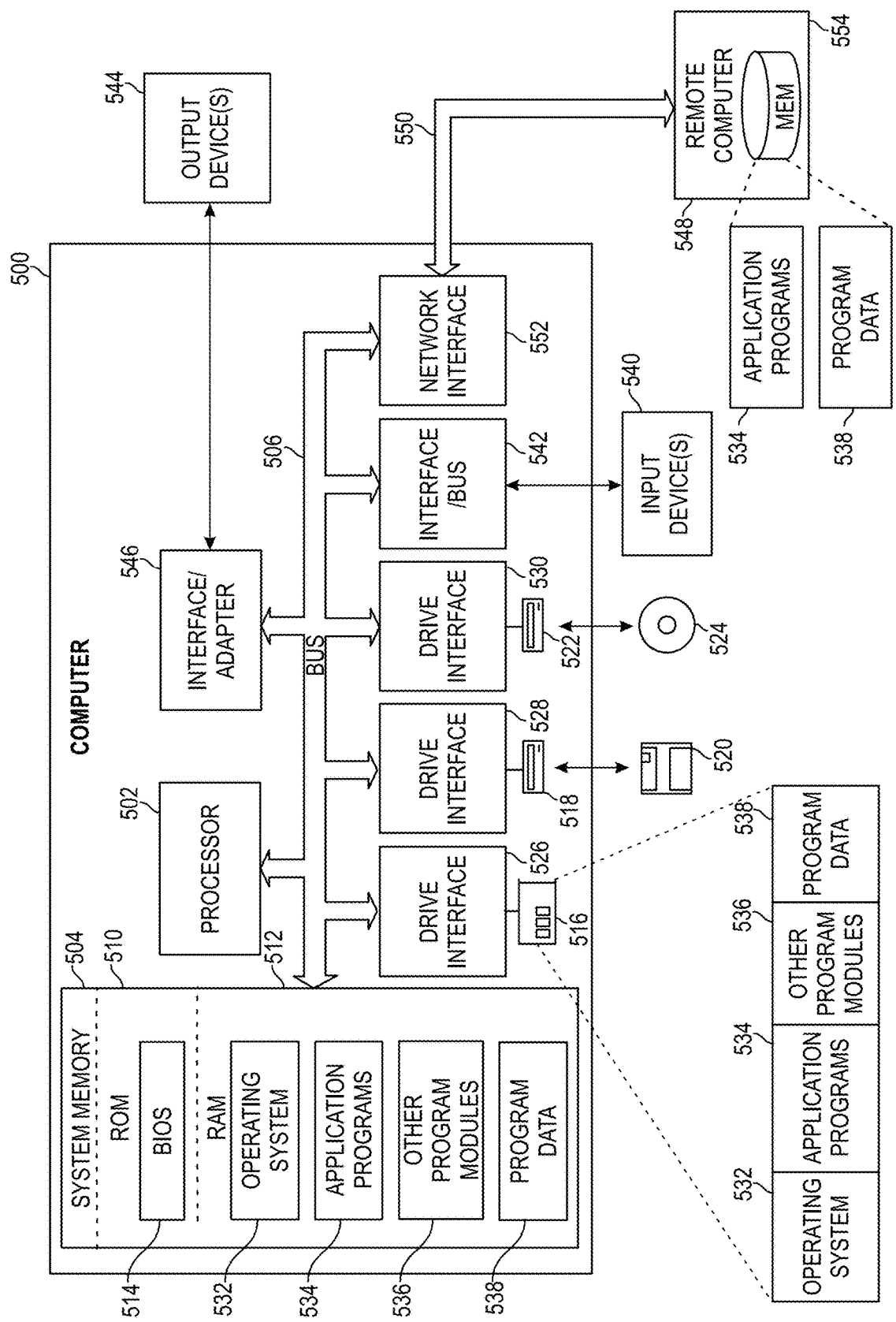
FIG. 5 illustrates one example of a computer system that can be employed to execute one or more embodiments of the present disclosure.

In this regard. FIG. 5 illustrates one example of a computer system 500 that can be employed to execute one or more embodiments of the present disclosure. Computer system 500 can be implemented on one or more general purpose networked computer systems, embedded computer systems, routers, switches, server devices, client devices, various intermediate devices/nodes or standalone computer systems. Additionally, computer system 500 can be implemented on various mobile clients such as, for example, a personal digital assistant (PDA), laptop computer, pager, and the like, provided it includes sufficient processing capabilities.

Computer system 500 includes processing unit 502, system memory 504, and system bus 506 that couples various system components, including the system memory 504, to processing unit 502. Dual microprocessors and other multi-processor architectures can also be used as a processing unit 502. System bus 506 may be any of several types of bus structure including a memory bus or memory controller, a peripheral bus, and a local bus using any of a variety of bus architectures. System memory 504 includes read only memory (ROM) 510 and random-access memory (RAM) 512. A basic input/output system (BIOS) 514 can reside in ROM 510 containing the basic routines that help to transfer information among elements within computer system 500.

Computer system 500 can include a hard disk drive 516, magnetic disk drive 518, e.g., to read from or write to removable disk 520, and an optical disk drive 522, e.g., for reading CD-ROM disk 524 or to read from or write to other optical media. Hard disk drive 516, magnetic disk drive 518, and optical disk drive 522 are connected to system bus 506 by a hard disk drive interface 526, a magnetic disk drive interface 528, and an optical drive interface 530, respectively. The drives and associated computer-readable media provide nonvolatile storage of data, data structures, and computer-executable instructions for computer system 500. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of the embodiments shown and described herein.

A number of program modules may be stored in drives and RAM 510, including operating system 532, one or more application programs 534, other program modules 536, and program data 538. In some examples, the application programs 534 can include neural network training and validation programs, deep learning methods, and the like; and the program data 538 can include collected data, the prepared data, graphical representations of the seismic forward models, a possible scenario associated with a seismic amplitude anomaly, a reservoir map, and other outputs to identify prospective hydrocarbon deposits produced by applying the cross-plot correlation described herein. The application programs 534 and program data 538 can include functions and methods programmed to perform various analyses or apply various algorithms described herein.

A user may enter commands and information into computer system 500 through one or more input devices 540, such as a pointing device (e.g., a mouse, touch screen), keyboard, microphone, joystick, game pad, scanner, and the like. For instance, the user can employ input device 540. These and other input devices 540 are often connected to processing unit 502 through a corresponding port interface 542 that is coupled to the system bus, but may be connected by other interfaces, such as a parallel port, serial port, or universal serial bus (USB). One or more output devices 544 (e.g., display, a monitor, printer, projector, or other type of displaying device) is also connected to system bus 506 via interface 546, such as a video adapter.

Computer system 500 may operate in a networked environment using logical connections to one or more remote computers, such as remote computer 548. Remote computer 548 may be a workstation, computer system, router, peer device, or other common network node, and typically includes many or all of the elements described relative to computer system 500. The logical connections, schematically indicated at 550, can include a local area network (LAN) and/or a wide area network (WAN), or a combination of these, and can be in a cloud-type architecture, for example configured as private clouds, public clouds, hybrid clouds, and multi-clouds. When used in a LAN-networking environment, computer system 500 can be connected to the local network through a network interface or adapter 552. When used in a WAN-networking environment, computer system 500 can include a modem, or can be connected to a communications server on the LAN. The modem, which may be internal or external, can be connected to system bus 506 via an appropriate port interface. In a networked environment, application programs 534 or program data 538 depicted relative to computer system 500, or portions thereof, may be stored in a remote memory storage device 554.

Nonlimiting Example Embodiments

Embodiment A. A method comprising: identifying a seismic amplitude anomaly in seismic data of a portion of a subterranean formation; associating geological-property data, geophysical-parameter data, or both corresponding to the seismic amplitude anomaly with the identified seismic amplitude anomaly; producing one or more seismic forward models each based on a scenario that accounts for an actual seismic amplitude response for the seismic amplitude anomaly and the geological-property data and/or geophysical-parameter data, wherein at least one of the one or more seismic forward models includes at least one seismic imaging artifact; adjusting input parameters for each of the one or more seismic forward models so that a seismic amplitude response produced by the seismic forward model at least substantially matches the actual seismic amplitude response for the seismic amplitude anomaly; training a supervised neural network using the one or more seismic forward models and corresponding adjusted input parameters; and generating a synthetic seismic forward model with the trained neural network.

Embodiment A may include one or more of the following: Element 1: the method further comprising: validating the synthetic seismic forward model using a second seismic amplitude anomaly and geological-property data and/or geophysical-parameter data corresponding to the second seismic amplitude anomaly; Element 2: Element 1 and the method further comprising: analyzing a second portion of the subterranean formation with a validated, synthetic seismic forward model to identify one or more seismic amplitude anomalies corresponding to a prospective hydrocarbon deposit; Element 3: Element 1 and the method further comprising: outputting the prospective hydrocarbon deposit in a 3-dimensional model; Element 4: Element 1 and the method further comprising: performing a hydrocarbon exploration operation into the prospective hydrocarbon deposit; Element 5: wherein the geological-property data is selected from the group consisting of a rock matrix, a porosity, a lithology, a pore fluid, and any combination thereof;

Element 6: wherein the geophysical parameter data is selected from the group consisting of a signal-to-noise ratio, a seismic frequency, a wavelet, and any combination thereof; Element 7: wherein the input parameters are selected from the group consisting of seismic velocity Vs, seismic velocity Vp, density, seismic frequency, tuning thickness, and any combination thereof; Element 8: wherein the training uses a gradient-based method and back-propagation method; and Element 9: wherein the supervised neural network is a convolutional neural network. Examples of combinations may include, but are not limited to, Element 1 in combination with one or more of Elements 2-9; Element 2 (optionally in combination with Element 3, Element 4, or both Elements 3-4) in combination with one or more of Elements 5-9; Element 5 in combination with one or more of Elements 6-9; and two or more of Elements 6-9 in combination.

Embodiment B. A machine-readable storage medium having stored thereon a computer program comprising a routine of set instructions for causing the machine to perform the steps of: identifying a seismic amplitude anomaly in seismic data of a portion of a subterranean formation; associating geological-property data and/or geophysical-parameter data corresponding to the seismic amplitude anomaly therewith; producing one or more seismic forward models each based on a scenario that accounts for an actual seismic amplitude response for the seismic amplitude anomaly and the geological-property data and/or geophysical-parameter data, wherein at least one of the one or more seismic forward models includes at least one seismic imaging artifact; adjusting input parameters for each of the one or more seismic forward models so that a seismic amplitude response produced by the seismic forward model at least substantially matches the actual seismic amplitude response for the seismic amplitude anomaly; training a supervised neural network using the one or more seismic forward models and corresponding adjusted input parameters; and generating a synthetic seismic forward model with the trained neural network.

Embodiment B may include one or more of the following: Element 10: wherein the steps further comprise: validating the synthetic seismic forward model using a second seismic amplitude anomaly and geological-property data and/or geophysical-parameter data corresponding to the second seismic amplitude anomaly; Element 11: Element 10 and wherein the steps further comprise: analyzing a second portion of the subterranean formation with a validated, synthetic seismic forward model to identify one or more seismic amplitude anomalies corresponding to a prospective hydrocarbon deposit; Element 12: Element 11 and wherein the steps further comprise: outputting the prospective hydrocarbon deposit in a 3-dimensional model; Element 13: Element 11 and wherein the steps further comprise: causing a drilling system to perform at least a portion of a hydrocarbon exploration operation into the prospective hydrocarbon deposit; Element 14: wherein the geological-property data is selected from the group consisting of a rock matrix, a porosity, a lithology, a pore fluid, and any combination thereof; Element 15: wherein the geophysical-parameter data is selected from the group consisting of a signal-to-noise ratio, a seismic frequency, a wavelet, and any combination thereof; Element 16: wherein the input parameters are selected from the group consisting of seismic velocity Vs, seismic velocity Vp, density, seismic frequency, tuning thickness, and any combination thereof; Element 17: wherein the training uses a gradient-based method and back-propagation method; and Element 18: wherein the supervised neural network is a convolutional neural network. Examples of combinations may include, but are not limited to, Element 10 in combination with one or more of Elements 11-18; Element 11 (optionally in combination with Element 12, Element 13, or both Elements 12-13) in combination with one or more of Elements 14-18; Element 14 in combination with one or more of Elements 15-18; and two or more of Elements 15-18 in combination.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method comprising:
   identifying a seismic amplitude anomaly in seismic data of a portion of a subterranean formation;
   associating geological-property data, geophysical-parameter data, or both corresponding to the seismic amplitude anomaly with the identified seismic amplitude anomaly;
   producing a one or more seismic forward models each based on a scenario that accounts for an actual seismic amplitude response for the seismic amplitude anomaly and the geological-property data and/or geophysical-parameter data, wherein at least one of the one or more seismic forward models includes at least one seismic imaging artifact;
   adjusting input parameters for each of the one or more seismic forward models so that a seismic amplitude response produced by the seismic forward model at least substantially matches the actual seismic amplitude response for the seismic amplitude anomaly;
   training a supervised neural network using the one or more seismic forward models and corresponding adjusted input parameters; and
   generating a synthetic seismic forward model with the trained neural network.

2. The method of claim 1 further comprising:
   validating the synthetic seismic forward model using a second seismic amplitude anomaly and geological-property data and/or geophysical-parameter data corresponding to the second seismic amplitude anomaly.

3. The method of claim 2 further comprising:
   analyzing a second portion of the subterranean formation with a validated, synthetic seismic forward model to identify one or more seismic amplitude anomalies corresponding to a prospective hydrocarbon deposit.

4. The method of claim 3 further comprising:
   outputting the prospective hydrocarbon deposit in a 3-dimensional model.

5. The method of claim 3 further comprising:
   performing a hydrocarbon exploration operation into the prospective hydrocarbon deposit.

6. The method of claim 1, wherein the geological-property data is selected from the group consisting of a rock matrix, a porosity, a lithology, a pore fluid, and any combination thereof.

7. The method of claim 1, wherein the geophysical-parameter data is selected from the group consisting of a signal-to-noise ratio, a seismic frequency, a wavelet, and any combination thereof.

8. The method of claim 1, wherein the input parameters are selected from the group consisting of seismic velocity Vs, seismic velocity Vp, density, seismic frequency, tuning thickness, and any combination thereof.

9. The method of claim 1, wherein the training uses a gradient-based method and back-propagation method.

10. The method of claim 1, wherein the supervised neural network is a convolutional neural network.

11. A machine-readable storage medium having stored thereon a computer program comprising a routine of set instructions for causing the machine to perform the steps of:
  identifying a seismic amplitude anomaly in seismic data of a portion of a subterranean formation;
  associating geological-property data and/or geophysical-parameter data corresponding to the seismic amplitude anomaly therewith;
  producing one or more seismic forward models each based on a scenario that accounts for an actual seismic amplitude response for the seismic amplitude anomaly and the geological-property data and/or geophysical-parameter data, wherein at least one of the one or more seismic forward models includes at least one seismic imaging artifact;
  adjusting input parameters for each of the one or more seismic forward models so that a seismic amplitude response produced by the seismic forward model at least substantially matches the actual seismic amplitude response for the seismic amplitude anomaly;
  training a supervised neural network using the one or more seismic forward models and corresponding adjusted input parameters; and
  generating a synthetic seismic forward model with the trained neural network.

12. The machine-readable storage medium of claim 11, wherein the steps further comprise:
  validating the synthetic seismic forward model using a second seismic amplitude anomaly and geological-property data and/or geophysical-parameter data corresponding to the second seismic amplitude anomaly.

13. The machine-readable storage medium of claim 12, wherein the steps further comprise:
  analyzing a second portion of the subterranean formation with a validated, synthetic seismic forward model to identify one or more seismic amplitude anomalies corresponding to a prospective hydrocarbon deposit.

14. The machine-readable storage medium of claim 13, wherein the steps further comprise:
  outputting the prospective hydrocarbon deposit in a 3-dimensional model.

15. The machine-readable storage medium of claim 13, wherein the steps further comprise:
  causing a drilling system to perform at least a portion of a hydrocarbon exploration operation into the prospective hydrocarbon deposit.

16. The machine-readable storage medium of claim 11, wherein the geological-property data is selected from the group consisting of a rock matrix, a porosity, a lithology, a pore fluid, and any combination thereof.

17. The machine-readable storage medium of claim 11, wherein the geophysical-parameter data is selected from the group consisting of a signal-to-noise ratio, a seismic frequency, a wavelet, and any combination thereof.

18. The machine-readable storage medium of claim 11, wherein the input parameters are selected from the group consisting of seismic velocity Vs, seismic velocity Vp, density, seismic frequency, tuning thickness, and any combination thereof.

19. The machine-readable storage medium of claim 11, wherein the training uses a gradient-based method and back-propagation method.

20. The machine-readable storage medium of claim 11, wherein the supervised neural network is a convolutional neural network.

* * * * *